No. 737,509. PATENTED AUG. 25, 1903.
F. J. SMITH.
BICYCLE TIRE CLEANER.
APPLICATION FILED DEC. 4, 1902.
NO MODEL.
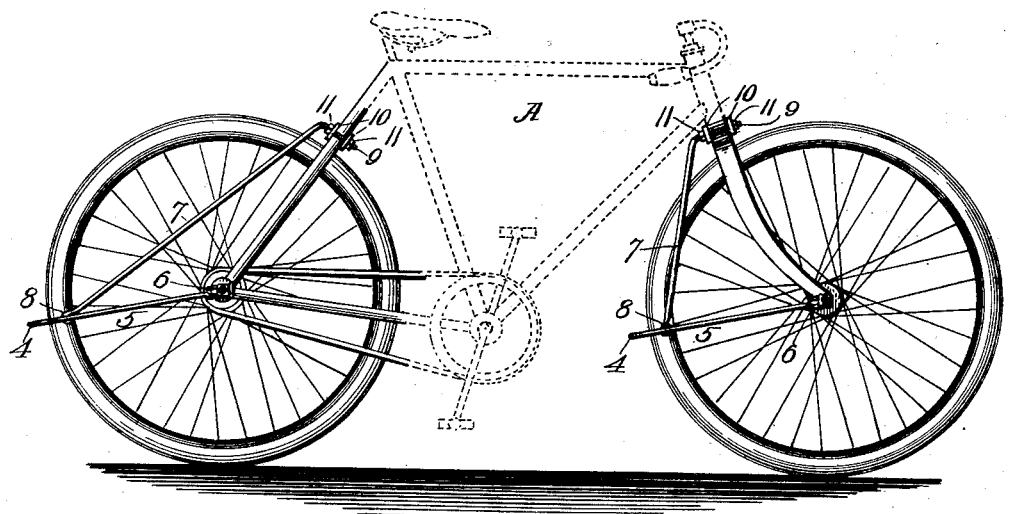
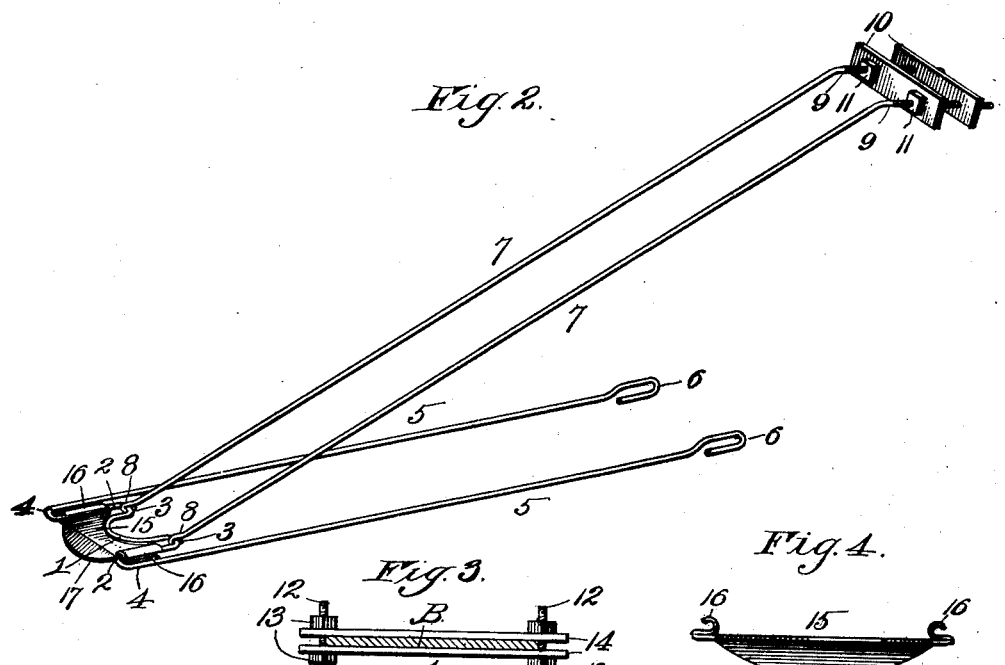
Witnesses:
A. McArthur
H. C. Rodgers
Inventor:
F. J. Smith
By George J. Thorpe
Atty.

No. 737,509.

Patented August 25, 1903.

UNITED STATES PATENT OFFICE.

FURMAN J. SMITH, OF SPRINGFIELD, MISSOURI.

BICYCLE-TIRE CLEANER.

SPECIFICATION forming part of Letters Patent No. 737,509, dated August 25, 1903.

Application filed December 4, 1902. Serial No. 133,840. (No model.)

*To all whom it may concern:*

Be it known that I, FURMAN J. SMITH, a citizen of the United States, residing at Springfield, in the county of Greene and State of Missouri, have invented certain new and useful Improvements in Bicycle-Tire Cleaners, of which the following is a specification.

My invention relates to bicycle-tire cleaners, and more especially to that class embodying a yoke portion supported contiguous to the tire and adapted to remove the accumulated mud therefrom as the wheel revolves; and my object is to produce a device of this character which performs its function efficiently and can be readily applied to or removed from a bicycle of any type and which is of simple, strong, durable, and cheap construction.

To this end the invention consists in certain novel and peculiar features of construction and combinations of parts, as hereinafter described and claimed, and in order that it may be fully understood reference is to be had to the accompanying drawings, in which—

Figure 1 represents a side elevation of a bicycle equipped with my improved tire-cleaner. Fig. 2 is an enlarged detail perspective view of the cleaner. Fig. 3 is a cross-section showing a modified form of the cleaner and also showing in cross-section a wheel and a mud-guard above the same as a support for such cleaner, and Fig. 4 is an edge view of the guard.

In the said drawings, A designates a bicycle with most of its framework shown in dotted lines and with each wheel equipped with a tire-cleaner constructed in accordance with my invention. The tire-cleaner is constructed as follows: A wire rod of suitable gage is bent to form a yoke 1 at its central portion and arms 2, the arms 2, by preference, projecting outwardly beyond the yoke, but united to the latter by transverse portions 3. The outer ends of said arms 2 are in turn connected by transverse portions 4 to a pair of long arms 5, extending substantially parallel with each other and terminating, by preference, at their opposite or inner ends in elongated loops 6.

7 designates a pair of braces made, preferably, from wire of the same gage as the yoke and terminating in eyes 8 at one end, which pivotally engage transverse portions 3 at the base of the yoke. The opposite ends of said brace-rods are bent at equal angles to provide arms 9, which arms are threaded for practically their entire length. A pair of clamp-plates 10 are mounted slidingly on said arms, and on the arms at the outer sides of plates 10 are clamping-nuts 11.

To secure a cleaner of this type in operative relation to either wheel of a bicycle, the taps on the ends of the axle are removed to enable the loops 6 to be slipped on such ends and the arms 5 adjusted longitudinally until the yoke is in close proximity to the tire and extending at the desired angle to the perpendicular, by preference, as shown in Fig. 1 of the drawings. Said taps are then retightened to clamp arms 5 and the yoke rigidly in such position. The brace-rods 7 are then swung forward at opposite sides of the upper portion of the wheel and the foremost plate and nuts 11 removed, so that the other plate can be brought to bear against the rear side of the rear or front forks, as the case may be, with the brace-rods at the outer sides of said fork. The first-named plate is then replaced at the forward side of the fork and the first-named nuts secured upon the ends of the rods and utilized to clamp plates 10 immovably upon the forks.

When occupying the position shown and described, it will be apparent that the cleaners will remove the mud from the wheels before it attains a position where it will become detached through centrifugal force and bespatter the rider, pedestrians near by, or drop down upon the hub and contiguous portions of the wheels or framework. Furthermore, it removes mud and accumulations which would otherwise adhere to the tire. It thus renders unnecessary, for most riders at least, the use of any of the common forms of mud-guards.

For use with a mud-guard—such, for instance, as the usual flat leather guard B, supported from the framework in the usual manner and capable of being tensioned—I provide a modified form of cleaner, the same consisting simply of the yoke and arms 2, without the radial arms 5 or braces 7. In this case the outer ends of the arms 2 are threaded, as at 12, and carry nuts 13 and clamping-plates 14, the latter being adjustable toward or from each other and arranged between the nuts, so as to be clamped tightly by the latter upon the mud-guard B, as shown in Fig. 3. This form, by reason of the threaded arms and nuts, is obviously adjustable toward or from the tire, and the same is true of the preferred form by the provision of the elongated loops 6. When the surface of the roadway is very wet, it will be found desirable to supplement the yoke with a guard to compel the accumulations removed from the wheel by the yoke to immediately drop back upon the ground instead of flying upwardly upon the rider or others nearby. This guard, by preference, consists of a sheet-metal plate 15, preferably secured slidably by spring-loops 16 to the arms 2 of the frame, with its inner edge concaved and juxtaposed with reference to the yoke 1, and its outer edge preferably formed with a downwardly and rearwardly extending lip or flange 17, which prevents the mud splashing directly backward after striking the body of the plate.

It will be seen that in both types my improved tire-cleaner not only possesses the features of advantage enumerated as desirable, but also the very necessary qualification of lightness, its weight, in fact, being so slight as to be unnoticeable. Furthermore, it is of graceful outline or configuration and does not detract from the appearance of the bicycle, as is the case with the usual form of mud-guard. It will be obvious, of course, that minor changes in the detail construction, form, proportion, and arrangement of the parts may be resorted to without departing from the spirit and scope of the invention.

Having thus described the invention, what I claim as new, and desire to secure by Letters Patent, is—

1. A cleaner for bicycle-tires and the like, comprising a wire frame consisting of a rod bent to form a yoke, outwardly-projecting arms at opposite sides of the yoke, and inwardly-projecting arms outward of the first-named arms; and a brace connected to the frame contiguous to the yoke.

2. A cleaner for bicycle-tires and the like, comprising a wire frame consisting of a rod bent to form a yoke, outwardly-projecting arms at opposite sides of the yoke, and inwardly-projecting arms outward of the first-named arms; a brace connected to the frame contiguous to the yoke; plates adjustable on the opposite end of the brace; and nuts engaging the brace outward of said plates.

3. A cleaner for bicycle-tires and the like, comprising a wire frame consisting of a rod bent to form a yoke, outwardly-projecting arms at opposite sides of the yoke, and inwardly-projecting arms outward of the first-named arms and terminating in loops at their inner ends; a brace consisting of a pair of rods pivotally connected to the outer portion of the frame, plates bridging the opposite ends of the brace-rods and adjustable thereon, and nuts on the rods at the outer sides of said plates.

4. A tire-cleaner for bicycles and the like, comprising a wire frame, consisting of a rod bent to form a yoke and outwardly-projecting arms at opposite sides of the yoke, a guard on the frame outward of the yoke, and means to secure the cleaner with its yoke astride of and in close proximity to the tire of the wheel.

5. A cleaner for bicycle-tires and the like, comprising a wire frame, consisting of a rod bent to form a yoke and outwardly-projecting arms at opposite sides of the yoke, a guard on the frame outward of the yoke and having its front edge concaved and its rear end provided with a depending flange, and means to secure the cleaner with its yoke astride of and in close proximity to the tire of the wheel.

In testimony whereof I affix my signature in the presence of two witnesses.

FURMAN J. SMITH.

Witnesses:
W. A. RATHBUN,
GEO. L. RATHBUN.